United States Patent
He et al.

(10) Patent No.: US 12,218,808 B2
(45) Date of Patent: *Feb. 4, 2025

(54) AVAILABILITY SLO-AWARE NETWORK OPTIMIZATION

(71) Applicant: Google LLC, Mountain View, CA (US)

(72) Inventors: Jinjie He, Santa Clara, CA (US); Matthew Johnston, Palo Alto, CA (US); Anurag Sharma, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/195,974

(22) Filed: May 11, 2023

(65) Prior Publication Data

US 2023/0283534 A1    Sep. 7, 2023

Related U.S. Application Data

(63) Continuation of application No. 17/498,918, filed on Oct. 12, 2021, now Pat. No. 11,695,651.

(51) Int. Cl.
*H04L 41/5025* (2022.01)
*H04L 41/0631* (2022.01)

(52) U.S. Cl.
CPC ........ *H04L 41/5025* (2013.01); *H04L 41/065* (2013.01)

(58) Field of Classification Search
CPC . H04L 41/5025; H04L 41/065; H04L 41/145; H04L 41/0823; H04L 41/0896;

(Continued)

(56) References Cited

U.S. PATENT DOCUMENTS

| 6,598,184 B1 | 7/2003 | Merget et al. |
| 8,214,317 B2 | 7/2012 | Aguilar et al. |

(Continued)

FOREIGN PATENT DOCUMENTS

| CN | 104778370 A | 7/2015 |
| EP | 3320653 A1 | 5/2018 |

OTHER PUBLICATIONS

"Esmaeili et al., Provisioning for Probabilistic Failure in Multi-Domain DWDM Networks, 2010, IEEE, 7th International Symposium on High-capacity Optical Networks and Enabling Technologies, IEEE, pp. 33-37" (Year: 2010).

(Continued)

*Primary Examiner* — Rasheed Gidado
(74) *Attorney, Agent, or Firm* — Lerner David LLP

(57) ABSTRACT

The subject matter described herein provides systems and techniques for a network planning and optimization tool that may allow for network capacity planning using key network failures for an arbitrary pair of network topology and demands. Performing network capacity planning with key network failures, instead of using other techniques, may avoid over-building the topology of a network. In particular, key network failures may be generated from the probabilistic failures, and the impact of these failures on a network may be computed. Expected flow availability SLO or a function thereof may be computed, using this information, and used by the tool to design a robust network. With an embedded flow availability calculation and updated risk framework, the capacitated cross-layer network topologies output by the tool may meet network demands/flows with their respective SLO type at the lowest cost.

20 Claims, 10 Drawing Sheets

(58) Field of Classification Search
CPC .. H04L 41/142; H04L 41/147; H04L 41/5019
See application file for complete search history.

(56) References Cited

U.S. PATENT DOCUMENTS

| | | | |
|---|---|---|---|
| 8,533,537 | B2 | 9/2013 | Nemecek et al. |
| 9,049,135 | B2 | 6/2015 | Otung |
| 9,590,892 | B2* | 3/2017 | Shah Heydari ......... G06F 11/30 |
| 9,722,912 | B2 | 8/2017 | Zhao et al. |
| 10,505,786 | B2 | 12/2019 | Schulz et al. |
| 10,819,618 | B1* | 10/2020 | Wada ...................... H04L 43/50 |
| 11,044,191 | B2* | 6/2021 | Vasseur ................ H04L 45/745 |
| 2015/0074023 | A1 | 3/2015 | Gu et al. |
| 2017/0012848 | A1* | 1/2017 | Zhao ...................... H04L 43/04 |
| 2017/0012856 | A1* | 1/2017 | Zhao ...................... G06F 30/18 |
| 2019/0165988 | A1* | 5/2019 | Wang ................... H04L 41/064 |
| 2022/0376984 | A1 | 11/2022 | Wen et al. |

OTHER PUBLICATIONS

Areias et al. Studying the Propagation of Failures in SOAs. 2015 IEEE International Conference on Dependable Systems and Networks Workshops, IEEE, Jun. 22, 2015 (Jun. 22, 2015), pp. 81-86.
Extended European Search Report for European Patent Application No. 22188518.9 dated Feb. 15, 2023. 10 pages.
Liu et al. FAVE: A fast and efficient network Flow Availability Estimation method with bounded relative error. IEEE INFOCOM 2019—IEEE Conference on Computer Communications, IEEE, Apr. 29, 2019 (Apr. 29, 2019), pp. 1783-1791.

* cited by examiner ated network planning and optimization tool. The tool may be used to automatically generate and select network failures for network planning. The tool may include a risk framework, which may include a network planning pipeline, that may enforce and may accurately estimate a service level objective (SLO), such as a flow availability SLO. As used herein, a SLO may include a network objective such as a likelihood of network outage, latency, delivery, flow availability of the network, or business continuity. Although a flow availability SLO is used in the figures and examples described herein, this SLO may be interchanged with any other SLO without changing the scope and spirit of what is described.

AVAILABILITY SLO-AWARE NETWORK OPTIMIZATION

CROSS-REFERENCE TO RELATED APPLICATIONS

The present application is a continuation of U.S. patent application Ser. No. 17/498,918, filed Oct. 12, 2021, the disclosure of which is incorporated herein by reference.

BACKGROUND

One goal in network capacity planning is to ensure enough resources are allocated to prevent business-critical impacts on applications. Extra capacity is often allocated in order to protect against unexpected network failure events and in order to maintain business continuity. As the size of the network and its costs grow, it may be inefficient to plan capacity for a large number of network failure events. Further, it may be impossible to plan capacity for every possible network failure event. It is unclear which failure events for which the network should be prepared and the criteria to be used in determining those failures. Conventional techniques involve network planners manually hard-coding failure events that they think are of interest into a failure policy or a set of rules. This failure policy is passed to a network planning tool. As the size of the network grows, however, this process of hardcoding failures is more challenging and misses critical failure events. Moreover, as the size of the network grows, the number of constraints used by a solver of the network planning tool grows enormously large and becomes unwieldy. Expected flow availability Service Level Objective (SLO) is a general indicator/measurement of the resiliency and risk-sensitiveness of a network. The calculation of the expected flow availability SLO depends on failure events sampled from a failure space. As the size of the network grows, the set of failures generated by the failure policy are insufficient to estimate expected flow availability SLO. Furthermore, existing network planning tools do not use a comprehensive risk framework with flow availability SLO measurement and enforcement. Hence, an output network capacity plan from such a tool does not perform optimally from the risk perspective and is not able to meet network demands/flows with their respective SLO type.

BRIEF SUMMARY

A network planning and optimization tool, also referred to as the tool herein, may be used to generate cost-effective network capacity plans, such as Wide Area Network (WAN) and datacenter capacity plans. Described herein is an automated network planning and optimization tool. The tool may be used to automatically generate and select network failures for network planning. The tool may include a risk framework, which may include a network planning pipeline, that may enforce and may accurately estimate a service level objective (SLO), such as a flow availability SLO. As used herein, a SLO may include a network objective such as a likelihood of network outage, latency, delivery, flow availability of the network, or business continuity. Although a flow availability SLO is used in the figures and examples described herein, this SLO may be interchanged with any other SLO without changing the scope and spirit of what is described.

Instead of protecting traffic from a predetermined set of failures chosen by policy as in conventional systems, the tool may be used to generate a dynamic set of probabilistic failures based on failure rates/probabilities. Key network failures may be generated from this dynamic set of failures. The tool may use these key network failures to enrich the risk framework and design optimized networks. Networks designed using this technique may meet network demands, may meet a network SLO, and may be designed at a sufficiently low cost.

In some examples, the key network failures may be chosen based on their stack rankings with respect to their impact on the network. In some examples, the impact may be an unrouted fraction of network traffic caused by the network failures and/or a network's state probability. The impact may be related to a SLO, such as network failure-flow impact on flow availability SLO. When evaluating the impact of possible failures using aspects of the tool, failures with small failure probabilities or a low impact to the network may not be considered in network optimization. Performing network optimization by generating and using key network failures, without considering additional or different failures, may be faster and more computationally efficient than conventional techniques, and may produce a sufficiently high accuracy of flow availability SLO.

In some examples, the network planning and optimization tool may allow for network capacity planning using key network failures for an arbitrary pair of network topology and demands. Performing network capacity planning with key network failures, instead of using other techniques, may avoid over-building the topology of a network. With an embedded flow availability calculation and updated risk framework, capacitated cross-layer network topologies output by the tool may meet network demands/flows with their respective SLO type at the lowest cost. In particular, the tool may generate optimized cross-layer network topologies that are capable of operating within a particular flow availability SLO range.

In some examples, the network planning and optimization tool may include and use an estimated flow availability SLO measure for network planning, capacity planning, and risk analysis. In some examples, the flow availability SLO may be tuned to match a computed flow availability SLO from a network simulator. The network planning and optimization tool may generate cross-layer network topologies that meet a flow availability SLO by computing networks that are capable of operating within a particular flow availability SLO range. The approach as presented herein generates failures probabilistically, generates key network failures from the probabilistic failures, and computes the impact of these failures on a network. Expected flow availability SLO or a function thereof may be computed, using this information, and used by the network planning and optimization tool to design a robust network.

In general, one aspect of the subject matter described in this specification includes a process of determining network failures. A set of probabilistic failures for a network topology may be generated, using one or more processors, based at least on failure generation rules and failure rates. A risk analysis may be performed, with the one or more processors, using the set of probabilistic failures to determine a failure-flow impact for each probabilistic failure in the set of probabilistic failures. Each probabilistic failure in the set of probabilistic failures may be stack ranked, with the one or more processors, based on its respective failure-flow impact to generate a stack ranked set of probabilistic failures. Key network failures may be provided to a network planning and optimization tool based on the stack ranked set of probabilistic failures. The key network failures may be a subset of the stack ranked set of the probabilistic failures. The network planning and optimization tool may use the key network failures to generate one or more capacitated network topologies. The failure-flow impact may be related to a flow availability service level objective (SLO). The key network failures may each be associated with a failure-flow impact that causes the unrouted fraction of network traffic for the network topology to be higher than a threshold. The threshold may be based on attributes of the network topology. The network planning and optimization tool may use the key network failures and the network topology to determine a new network topology. The set of probabilistic failures may be generated for the network topology using at least one of a global probabilistic failure generator, a regional probabilistic failure generator, and a metro pair probabilistic failure generator. Non-essential failures may be another subset of the stack ranked set of probabilistic failures.

Another aspect of the subject matter includes a system for determining network failures that includes one or more memories for storing key network failures and one or more processors configured to perform various steps. A set of probabilistic failures for a network topology may be generated based at least on failure generation rules and failure rates. A risk analysis may be performed using the set of probabilistic failures to determine a failure-flow impact for each probabilistic failure in the set of probabilistic failures. Each probabilistic failure in the set of probabilistic failures may be stack ranked based on its respective failure-flow impact to generate a stack ranked set of probabilistic failures. Key network failures may be stored in the one or more memories. The key network failures may be a subset of the stack ranked set of the probabilistic failures. The key network failures may be provided to a network planning and optimization tool based on the stack ranked set of probabilistic failures. The network planning and optimization tool may use the key network failures to generate one or more capacitated network topologies. The failure-flow impact may be related to a flow availability service level objective (SLO). The key network failures may each be associated with a failure-flow impact that causes the unrouted fraction of network traffic for the network topology to be higher than a threshold. The threshold may be based on attributes of the network topology. The network planning and optimization tool may use the key network failures and the network topology to determine a new network topology. The set of probabilistic failures may be generated for the network topology using at least one of a global probabilistic failure generator, a regional probabilistic failure generator, and a metro pair probabilistic failure generator. Non-essential failures may be another subset of the stack ranked set of probabilistic failures.

Yet another aspect of the subject matter includes a non-transitory computer-readable medium storing instructions, that when executed by one or more processors, cause the one or more processors to perform various steps. A set of probabilistic failures for a network topology may be generated based at least on failure generation rules and failure rates. A risk analysis may be performed using the set of probabilistic failures to determine a failure-flow impact for each probabilistic failure in the set of probabilistic failures. Each probabilistic failure in the set of probabilistic failures may be stack ranked based on its respective failure-flow impact to generate a stack ranked set of probabilistic failures. Key network failures may be provided to a network planning and optimization tool based on the stack ranked set of probabilistic failures. The key network failures may be a subset of the stack ranked set of the probabilistic failures. The network planning and optimization tool may use the key network failures to generate one or more capacitated network topologies. The failure-flow impact may be related to a flow availability service level objective (SLO). The key network failures may each be associated with a failure-flow impact that causes the unrouted fraction of network traffic for the network topology to be higher than a threshold.

DETAILED DESCRIPTION

Figure 1:
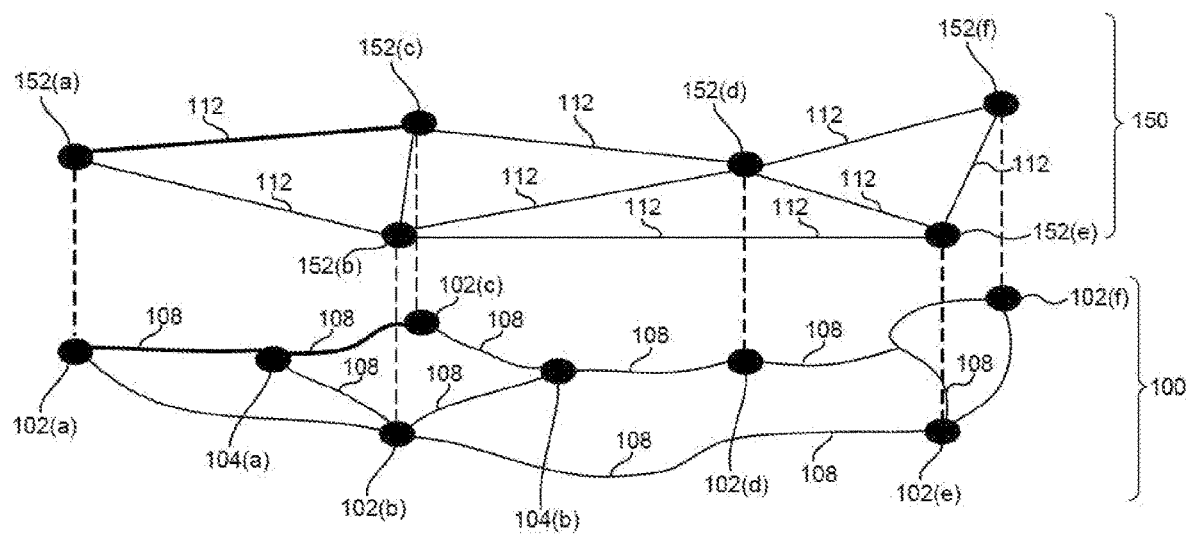
FIG. 1 depicts an example physical topology of a network and a logical topology implemented on the physical topology of the network.

FIG. 1 depicts an example physical topology of a network 100 and a logical topology 150 implemented on the physical topology of the network 100. The network 100 includes nodes 102(a), 102(b), 102(c), 102(d), 102(e), and 102(f), generally referred to as nodes 102. The nodes may be coupled to each other directly and/or through switches, such as switches 104(a) and 104(b), generally referred to as switches 104. The nodes may be coupled to each other and/or to switches 104 through physical communication links 108. In some examples, the switches 104 may be wavelength selective switches, optical circuit switches (OCSs), and/or other switches. In some examples, a physical topology is referred to as a L1 topology, which refers to the first level in the open systems interconnection (OSI) stack. The logical topology 150, which may be mapped to network 100, may include nodes 152(a), 152(b), 152(c), 152(d), 152(e), and 152(f), generally referred to as nodes 152. These nodes 152 may have a one-to-one mapping to respective nodes 102(a), 102(b), 102(c), 102(d), 102(e), and 102(f), as shown. The logical topology 150 may define how the nodes 152 communicate across the network 150 by showing the logical communication links 112 that are available for communication between the nodes 152. Because of the one-to-one mapping between the nodes 152 and the nodes 102, the logical topology 150 may therefore also define how the nodes 102 may communicate across the network 100, which may include switches 104, to each other. For example, one of the switches 104(a) may couple the nodes 102(a), 102(b), and 102(c) to each other and to possibly other nodes. Logical communication links 112 may form the connection between these nodes within the logical topology 150. The mapping between the physical topology of the network 100 and the logical topology 150 may be referred to as a cross-layer network topology. In some implementations, a logical topology is referred to as a L3 topology, which refers to the third level in the open systems interconnection (OSI) stack.

Figure 2:
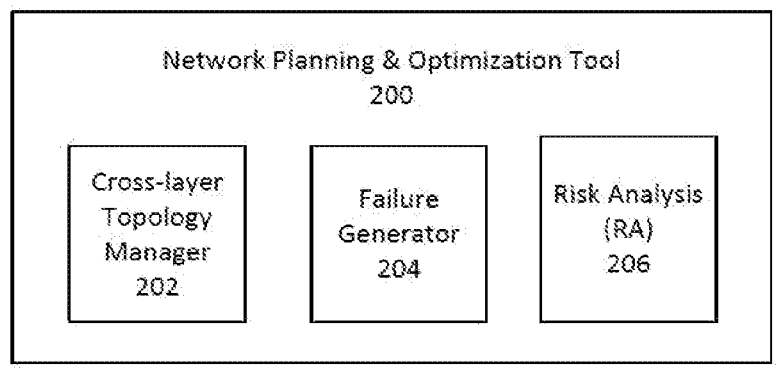
FIG. 2 depicts an example block diagram of a network planning and optimization tool.

FIG. 2 depicts an example block diagram of a network planning and optimization tool 200. The network planning and optimization tool 200 may include a cross-layer topology manager 202 that may be used to generate cross-layer network topologies, which may include mappings between a physical L1 topology of a network and the logical L3 topology of the network. The network planning and optimization tool 200 may include a failure generator 204 that may be used to generate network failures. The network planning and optimization tool 200 may also include a risk analysis component 206 that may execute a risk analysis algorithm and/or a traffic simulator.

The network planning and optimization tool 200 may be implemented by special purpose logic circuitry, such as a field programmable gate array (FPGA), an application specific integrated circuit (ASIC), a general purpose processor, and/or one or more components of a general purpose electronic device. The network planning and optimization tool 200 may also include or may be implemented by code stored on a computer readable medium that, when executed, causes the network planning and optimization tool 200 to perform one or more of the processes described herein.

The cross-layer topology manager 202 may be a hardware or software component, and may be configured to generate one or more topologies, such as capacitated cross-layer network topologies. These network topologies may include a logical, L3, topology, a physical, L1, topology, one or more mappings between the L3 and L1 topologies that help define the cross-layer network topology, and/or the capacities of the links or nodes of the network. In some examples, generating the one or more physical topologies of a network, one or more logical topologies of a network, and/or one or more capacitated cross-layer network topologies may be referred to as "computing a network." In some examples, the cross-layer topology manager 202 may attempt to compute networks that reduce the overall cost of the network, but also enable the network to satisfy availability, latency, and/or bandwidth demands. The cost of the network may be the monetary cost of the network. The cost of the network may instead be a possibility of failure of network assets, such as physical transport links, devices, and Single Point of Failures, SPOFs, the amount of energy used by the network, the amount of bandwidth needed by the network, a characteristic of the network that needs to be minimized, and/or some other attribute associated with the network. In some examples, the cross-layer topology manager 202 may include a mixed integer-linear problem solver to compute a reduced cost network that satisfies a plurality of constraints.

In computing a network, the cross-layer topology manager 202 may receive as input network topology data, capacity data, latency data, network demand(s), per flow demand(s) with respective SLO type(s), traffic data, equipment data, availability data, other network attributed data and/or a combination thereof as constraints. For example, when developing a network model that reduces overall cost, the cross-layer topology manager 202 may receive information about the physical structures of the network. The cross-layer topology manager 202 may also receive, as inputs, a set of possible failures, such as probabilistic failures and/or key network failures, from the failure generator 204 or other components of the network planning and optimization tool 200 before computing a network. The cross-layer topology manager may additionally receive one or more inputs from risk analysis component 206. These inputs could include a SLO, such a flow availability SLO, a failure-flow impact, an unrouted fraction of traffic for a flow or for the network, and/or data validating that a given network topology meets a SLO or network traffic demands.

The failure generator 204, may be a hardware or software component, and may generate combinations of possible failures that can occur in the network. Each of the possible failures may sometimes be referred to as a failure sample, and may include the failure and/or failure rate/probability of one or more network assets. In some examples, the failure generator 204 may accept as input user instructions or failure generation policies/rules for the generation of possible failures. In some examples, the possible failures generated by the failure generator 204 may be the failures likely to occur in the network based on the past failure data. In these examples, the failure generator 204 may accept failure rate data as input, such as the probability that a network asset will fail, for example, at a specified time. In these examples, the set of possible failures generated by the failure generator 204 may be referred to as probabilistic failures. In some examples this set of probabilistic failures may be used by the risk analysis component 206 executing a risk analysis algorithm along with a capacitated cross-layer network topology generated by the cross-layer topology manager 202 to determine key network failures. In some examples, the possible failures generated by the failure generator 204, in conjunction with other components, may include key network failures. In some examples, the failure generator 204 may include additional modules to generate probabilistic failures, from which the key failures may be generated. In these examples, these modules may include a global probabilistic failure generator, a regional, such as metro, probabilistic failure generator, and/or a metro pair probabilistic failure generator, described further below.

Risk analysis component 206 may be a hardware or software component, and may describe or quantify a particular level of risk related to a network SLO, such as a flow availability SLO. In some examples, the risk analysis component 206 may simulate failures or other outages in the network to ensure that the risk levels related to the network are within a specified range. The risk analysis component 206 may receive data generated by, or received by, the cross-layer topology manager 202 and/or the failure generator 204. In some examples, the risk analysis component 206 may use a risk analysis algorithm to determine whether the network defined by the capacitated cross-layer network topology, including the associated L1 and L3 network topologies, is capable of fulfilling network traffic demands. If the network topology is unable to fulfil traffic demand, the risk analysis component 206 may also determine the amount of unrouted fraction of network traffic demanded for the traffic and network flows. In some examples, the risk analysis component may use the risk analysis algorithm to assist in generating key network failures using a set of probabilistic failures received from the failure generator 204. As will be described in greater detail below, these key network failures may be those network failures that cause greater than a particular amount of unrouted fraction of network traffic, those failures that cause the flow availability SLO to be below a certain value, those failures that cause a network failure state with a sufficiently high probability, and/or the like. In some examples, risk analysis component 206 may ensure that for any given network topology, the SLO is met.

In some examples, the risk analysis component 206 may include a traffic engineering simulator, also known as a network simulator, which may be a part of or separate from the aforementioned risk analysis algorithm. This simulator may use a traffic engineering algorithm to simulate the routing of traffic on a network. The traffic engineering algorithm may simulate the routing of traffic based on the capacitated network topology, the network traffic demands, and the possible failures in the network. In some examples, the traffic engineering algorithm used by the network simulator may use a Monte Carlo, a statistical, and/or a machine learning technique. This simulator may receive data, such as one or more capacitated cross-layer network topologies from the cross-layer topology manager 202, possible failures from failure generator 204, and data from other sources to compute a SLO, such as a flow availability SLO. The simulator may also be used to determine whether network traffic demands for each cross-layer network topology model are satisfied and which are not met along with the unrouted fraction of traffic.

In some examples, inputs to the network planning and optimization tool 200 may include: probabilistic failure generation rules, which may include a blast radius and/or failure generation threshold value(s), key network failures from previous operation of the tool 200, various flows and their associated network traffic demands, transport link failure rates/probabilities, device failure rates/probabilities, SPOF failure rates/probabilities, and/or other data related to a network topology, demands, network SLOs, and network failures. In some examples, flows with less than a specified size, such as between 1 Gbps and 5 Gbps, of demanded network traffic may not be considered for augmenting network or flow capacity or SLO compliance.

Figure 3:
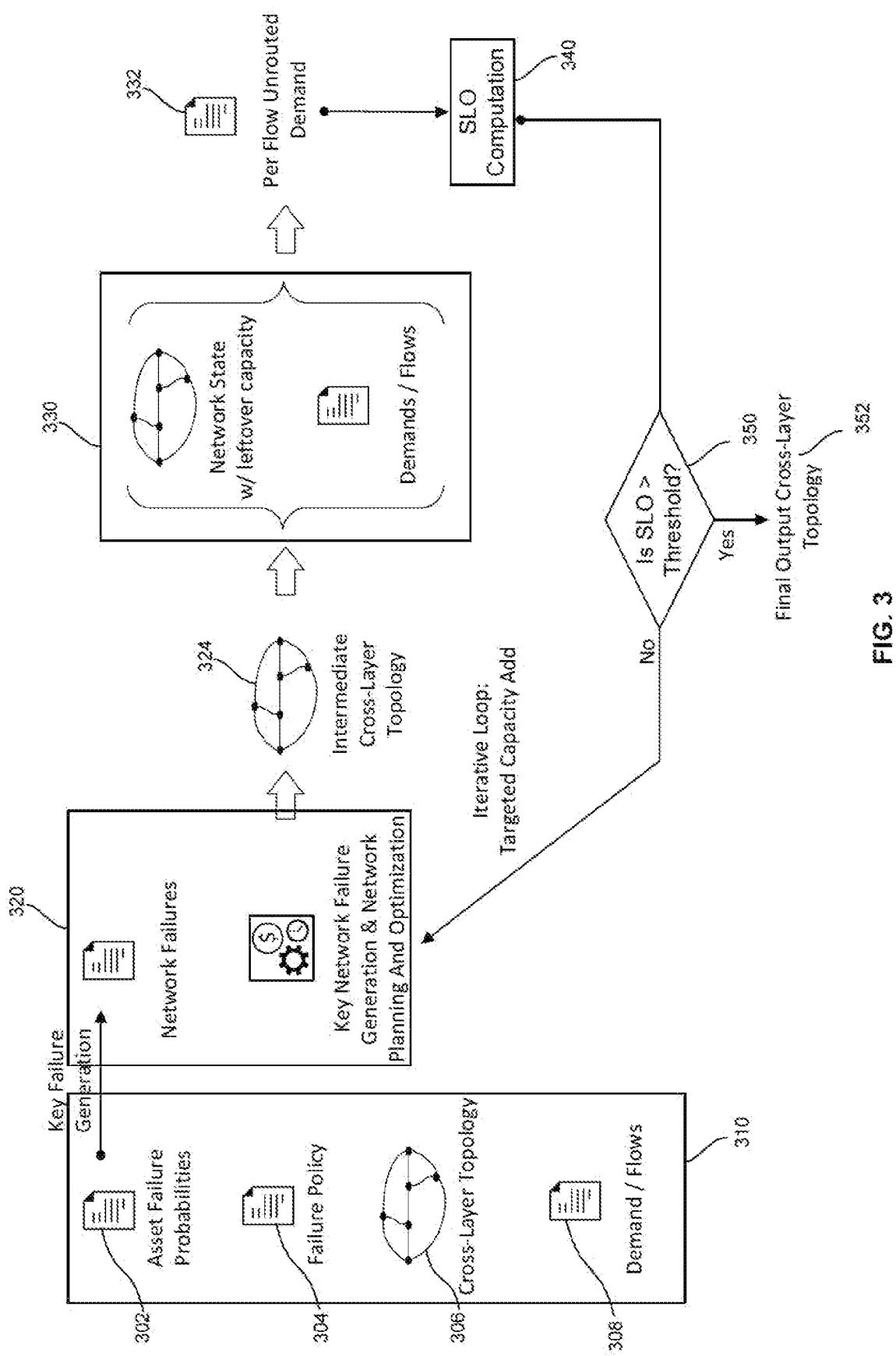
FIG. 3 depicts an example block flow diagram of a technique for determining a capacitated cross-layer network topology.

FIG. 3 depicts an example block flow diagram of a technique 300 for determining a capacitated cross-layer network topology. At block 310, the network planning and optimization tool, such as the tool 200 described in connection with FIG. 2, may receive multiple inputs. For example, at block 310, the network planning and optimization tool may receive as inputs: asset failure rates/probabilities 302, one or more failure policies/rules 304, an initial capacitated cross-layer topology 306, and/or network traffic demands and flows with their respective SLO type 308.

At block 320, the network planning and optimization tool may generate a set of key network failures 322 from the input(s) received at block 310, such as from asset failure rates/probabilities 302. The generation of key network failures is described in greater detail below with respect to FIGS. 7 and 8. At block 320, the key network failures may be used by the network planning and optimization tool to generate an intermediate capacitated cross-layer network topology 324. For example, a cross-layer topology manager, such as cross-layer topology manager 202 described in connection with FIG. 2, may be used to generate the capacitated cross-layer network topology. In some examples, upon the first operation of block 320, the network planning and optimization tool may use the one or more failure rules/policies, such failure policies/rules 304, to generate the intermediate capacitated cross-layer network topology 324. The capacitated cross-layer network topology 324 may be a cross-layer network topology that includes traffic capacities of the links and/or nodes of the network. In some examples, upon subsequent operations of block 320, the network planning and optimization tool may compute a network using the set of key network failures 322 to generate the intermediate capacitated cross-layer network topology 324. In some examples, the tool may add capacity to particular links and/or nodes of the capacitated cross-layer network topology. In these examples, the targeted addition of capacity may be to allow the network associated with the capacitated cross-layer network topology to meet the network traffic demands. As used herein, unless otherwise specified to be a logical or a physical network topology, a network topology refers to a cross-layer network topology.

At block 330, an algorithm may determine the routing for the intermediate capacitated cross-layer topology 324 using input demands and flows, such as demands and flows with their respective SLO type 308. The algorithm may be implemented by one of the components of the network planning and optimization tool, such as the traffic engineering algorithm used in the risk analysis component 206 described in connection with FIG. 2. The algorithm may determine the state of the network associated with the intermediate capacitated cross-layer topology 324 in terms of the leftover capacity when accounting for the key network failures and the resulting network per-flow capacities. At block 330, the algorithm may output the per-flow unrouted fraction of traffic demanded across all network states 332.

At block 340 a flow availability SLO or a function thereof may be computed based on the per-flow unrouted demand across all network states 332 output at block 330.

At block 350, it may be determined whether the flow availability SLO is above a predetermined threshold. If the flow availability SLO is above the predetermined threshold, the intermediate capacitated cross-layer topology 324 may be output at block 350 as the final capacitated cross-layer topology 352. If the flow availability SLO is below the predetermined threshold, the operations at block 320 may be performed using the intermediate capacitated cross-layer topology 324 with the targeted addition of capacity to accommodate the unrouted fraction(s) of demanded traffic. As such, the capacity of the network associated with the intermediate capacitated cross-layer topology may be augmented.

Each network asset, such as a transport link, device, and/or a SPOF may fail independently with a particular probability. For example, with approximately 700 network assets, there may be on the order of $2^{700}$ network states, which is approximately $5 \times 10^{210}$ network states. These network states may each be associated with different combinations of assets that fail. Each such state along with the probability that the state occurs, also known as a network's state probability, may be included in the set of probabilistic failures. Observations regarding the network states may be made based on this information. One observation is that the majority of network states may have a substantially low failure probability. An example of a network state that has a substantially low failure probability is one in which every network asset fails. Another observation is that many failure states may be repetitive in terms of having substantially similar impacts on flow availability SLO. As a result of these observations, it may be useful to identify a subset of key network failures, within the set of probabilistic failures. Key network failures may be those network failures that cause greater than a particular amount of unrouted fraction of network traffic, those failures that cause the flow availability SLO to be below a certain value, those failures that cause a network failure state with a sufficiently high probability, and/or the like. The key network failures may be used to accurately compute and estimate flow availability SLO or some function thereof. As a result, network design and capacity planning may be done with respect to key network failures rather than the larger sample space of network failures.

In some examples, key network failures may be events and/or network states that may be both probable and that may have a high impact of flow ability SLO. As an example, a first key network failure may be a dual asset failure network state in South America, and a second key network failure may be a dual asset failure network state in India. In this example, a network state simultaneously having a dual asset failure in South America and in India may not be considered as a key network failure because the inclusion of the aforementioned first and the second key network failures may be sufficient to protect the network from the potential simultaneous failure. As another example, a network state which includes losing every asset in South America may not be considered as a key failure because the probability of this occurring may be too low. The identified key network failures may be used to accurately compute and estimate flow availability SLO.

Figure 4:
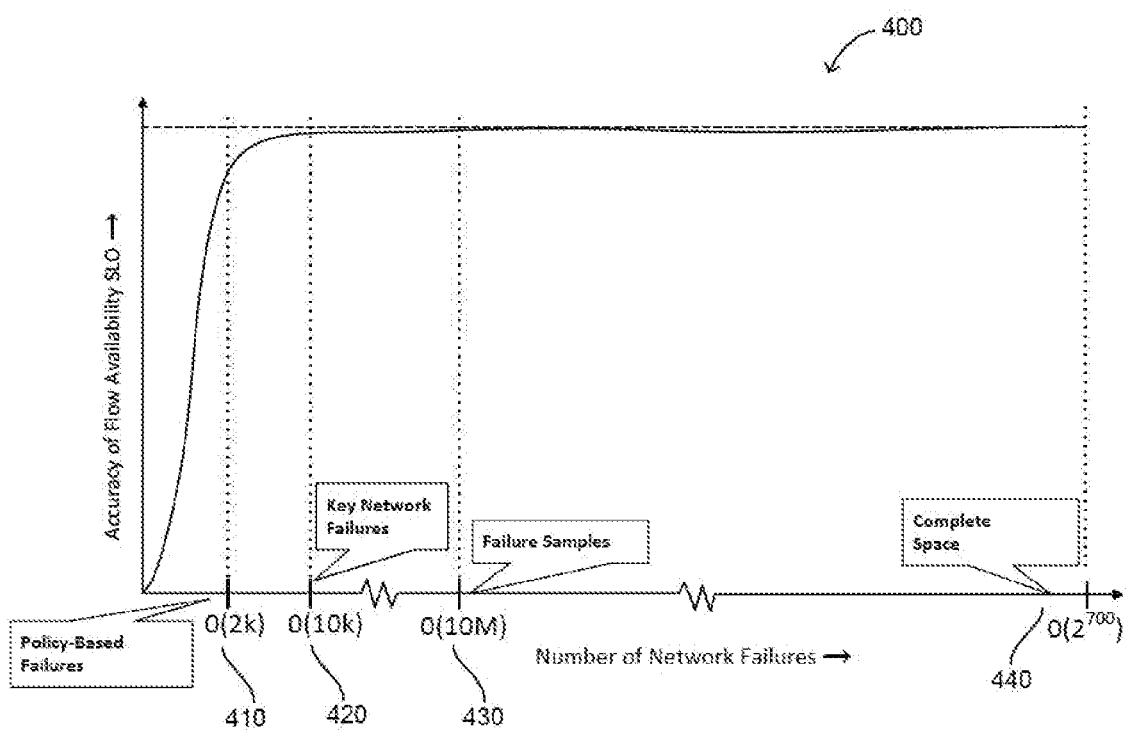
FIG. 4 depicts an example plot of a number of network failures versus accuracy of flow availability SLO for a particular sized network.

FIG. 4 depicts an example plot 400 of a number of network failures versus accuracy of flow availability SLO for a particular sized network. For example, the size of the network associated with plot 400 may include 700 assets, such as physical transport links, devices, and SPOFs. As can be seen in plot 400, as the number of network failures increase, the accuracy of flow availability SLO generally increases. In particular, if a policy that includes particular failure generation rules is taken into consideration, the number of network failures generated for consideration may be relatively small. For example, the number of policy-based network failures 410 may be on the order of 2K failures. However, if key network failures that may be generated from probabilistic failures are taken into consideration, the number of network failures that may be generated for consideration may be larger. For example, the number of failures taking into consideration key network failures 420 may be on the order of 10K failures. In this case, as can be seen from plot 400, the accuracy of flow availability SLO may be significantly less when only considering policy-based network failures than when considering key network failures. As can be seen in the plot, when the number of network failures considered is on the order of the number of sample failures 430 validated using a network simulator, such as 10 M network failures, the accuracy of flow availability SLO may be high. The accuracy of flow availability SLO may be similarly high and may not be significantly improved when considering the whole space of network failures 440, which may be on the order of $2^{700}$. The accuracy of flow availability SLO may be substantially similar when considering key network failures 420, as when considering the sample failures 430 or the whole space of network failures 440. Therefore determining key network failures may produce a sufficiently high accuracy of flow availability SLO, and considering additional failures may not significantly increase the accuracy of the flow availability SLO.

Figure 5:
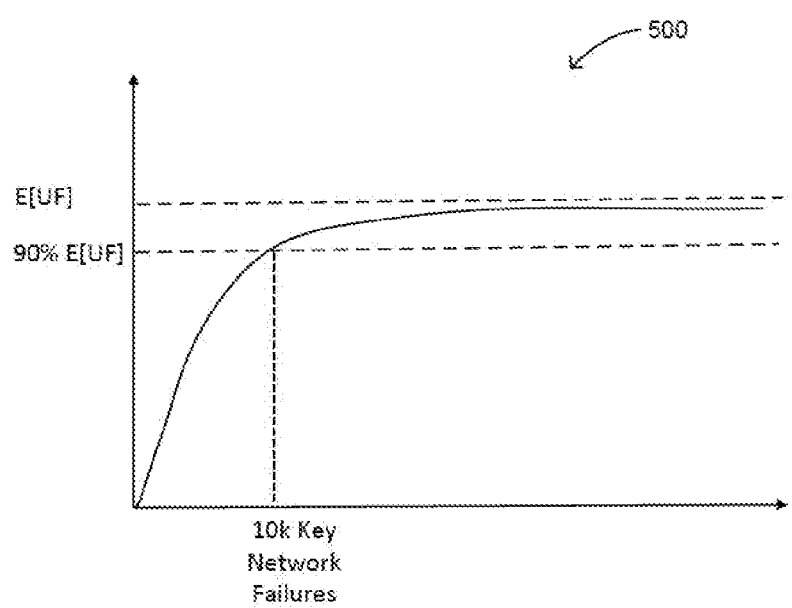
FIG. 5 depicts an example plot of a number of network failures versus the expected unrouted fraction of network traffic for a particular sized network.

FIG. 5 depicts an example plot 500 of a number of network failures versus the expected unrouted fraction of network traffic for a particular sized network. For example, the size of the network associated with plot 500 may include 700 assets, such as physical transport links, devices, and SPOFs. As can be seen from plot 500, key network failures may be those failures where the expected unrouted fraction of network traffic in the network may be higher than a particular percentage, such as 90%. For example, there may be on the order of 10K such key network failures.

The network planning and optimization tool may include a failure generator, such as failure generator 204 described with reference to FIG. 2. The network planning and optimization tool may include probabilistic failure generator modules to generate probabilistic failures from which key network failures may be generated. These modules may be a part of the failure generator or may be separate. In some examples, these modules may include a global probabilistic failure generator, a regional, such as metro, probabilistic failure generator, and a metro pair probabilistic failure generator. The global probabilistic failure generator may use a brute force approach to generate and include all network failures, such as network failure states, with a failure probability greater than or less than a specified threshold. The regional probabilistic failure generator may generate and include network failures, such as network failure states, that include failures in a specified region, such as around a target metro, with a failure probability greater than or less than a specified threshold. In some examples, the inputs to the regional probabilistic failure generator may include a target metro node and a region definition, such as a blast radius around the target metro node. For example, a blast radius of N may imply the failure of all assets connected to the target metro node and to metro nodes within N hops of the target metro node. In this example, the target metro may be represented by node 152(f), described in connection with FIG. 1, and the blast radius may be N=1. In this example, metro nodes within N=1 hop from node 152(f) may include metro nodes represented by 152(d) and 152(e), described in connection with FIG. 1. The metro pair probabilistic failure generator may generate and include network failures, such as network failure states, that include failures for assets used by k-paths between a target pair of metros, with a failure probability greater than or less than a specified threshold. In some examples, the inputs to the metro probabilistic failure generator may include the pair of target metro nodes and a list of communication links and/or SPOFs. For example, the pair of target metro nodes may be represented by nodes 152(a) and 152(f), described in connection with FIG. 1.

Key network failures may be generated, using the generated probabilistic failures, and tuned. As described above, in some examples, probabilistic failures may be generated using the global probabilistic failure generator, the regional, such as metro, probabilistic failure generator, or metro pair probabilistic failure generator, or any combination thereof. For example, the global probabilistic failure generator may generate network failures based on a failure probability threshold of greater than or less than $10^{-5}$. For example, the regional probabilistic failure generator may generate network failures based on a failure probability threshold of greater than or less than $10^{-8}$. For example, the metro pair probabilistic failure generator may generate network failures based on a failure probability threshold of greater than or less than $10^{-8}$. The generated probabilistic failures may be used to generate key network failures, as will be explained in greater detail below. In addition, when a flow associated with a capacitated cross-layer topology includes a measured flow availability SLO that is negative, the network planning and optimization tool may include network state(s) with failures whereby there is an unrouted fraction of demanded network traffic for that flow. The unrouted fraction of demanded network traffic may be compared with the output flow availability SLO report from a network simulator in order to tune and possibly add targeted network failures. Thus, the generation of key network failures may include a comparison to the output flow availability SLO report, from the network simulator, as a reference for tuning and possibly adding missing key network failures. For example, as a first step, the network simulator may be run with an input capacitated cross-layer topology and identified key network failures to identify a set of flow availability SLO fixable flows. The set of flow availability SLO flows that are not fixable may be due to issues with not having enough diverse paths in the cross-layer topology, and may not be due to having insufficient capacity. For example, as a second step, the network simulator may be executed with the capacitated cross-layer topology and the flows that include a measured flow availability SLO that is negative may be analyzed. Small-sized flows, such as those that are less than 1 Gbps, may be excluded from this analysis. The set of flow availability SLO flows that are not fixable may also be excluded from the analysis. The remaining flows that include a measured flow availability SLO that is negative may be analyzed. It may be determined whether there are missing key network failures associated with these flows and such key network failures may be found.

The flow availability SLO measured per flow using the network planning and optimization tool may be compared with the measured flow availability SLO per flow from the network simulator in order to tune and possibly add targeted network failures. The network planning and optimization tool may take an action based on the comparison. For example, in a first scenario, when the flow availability SLO, measured per flow using the network planning and optimization tool, is positive, and the measured flow availability SLO per flow from a network simulator is positive, no action may be taken. As another example, in a second scenario, when the flow availability SLO, measured per flow using the network planning and optimization tool, is negative, and the measured flow availability SLO per flow from a network simulator is positive, it may indicate that there is an error because this should not happen in the network planning and optimization tool. As yet another example, in a third scenario, when the flow availability SLO, measured per flow using the tool, is positive, and the measured flow availability SLO per flow from a network simulator is negative, it may indicate that there are missing failures that are not considered by the tool, and that the tool and/or the network simulator has to be debugged. As yet another example, in a fourth scenario, when the flow availability SLO, measured per flow using the tool, is negative, and the measured flow availability SLO per flow from a network simulator is negative, it may indicate that there are missing failures that are not considered by the tool, and that the tool and/or the network simulator has to be debugged. For example, in a fifth scenario, when the flow availability SLO, measured per flow using the tool, is negative, and the measured flow availability SLO per flow from a network simulator is negative, it may indicate that the flow is fixable and additional capacity may be added to the flow to improve the flow availability SLO. In these examples, when debugging of the tool and/or the network simulator is complete, a flow originally in scenario three or four should move to scenario five.

Figure 6:
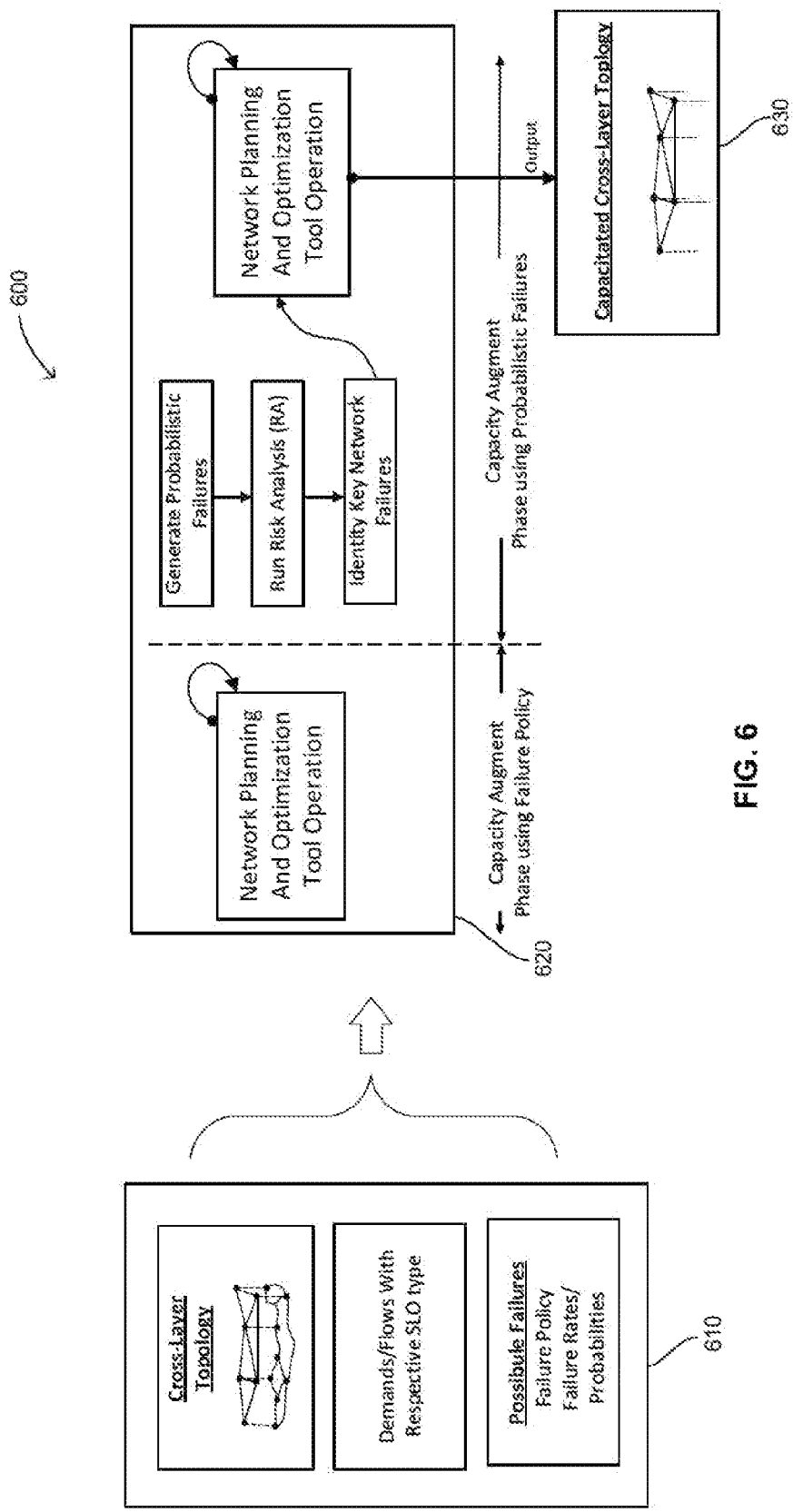
FIG. 6 depicts an example block flow diagram for a technique for determining a capacitated cross-layer topology for a network.

FIG. 6 illustrates an example block flow diagram for a technique 600 for determining a capacitated cross-layer topology for a network. Aspects of technique 600 and/or the blocks of technique 600 may be used in conjunction with technique 300 and/or the blocks of technique 300 described in connection with FIG. 3. At block 610, a network planning and optimization tool, such as the network planning and optimization 200 described in connection with FIG. 2, may receive multiple inputs. For example, at block 610, the network planning and optimization tool may receive as inputs: possible network failures, asset failure rates/probabilities and/or one or more failure policies, an initial capacitated cross-layer topology, and/or demands/flows with their respective SLO type.

In some examples, upon the first operation of block 620, the network planning and optimization tool may use the one or more failure policies to generate an intermediate capacitated cross-layer network topology from the initial capacitated cross-layer topology. Upon subsequent operation of block 620, the network planning and optimization tool may compute and use key network failures to generate a subsequent intermediate capacitated cross-layer network topology. In particular, the network planning and optimization tool may compute key network failures from one or more of the received inputs, such as from the possible network failures. To compute the key network failures, the network planning and optimization tool may generate probabilistic failures. For example, the probabilistic failures may be on the order of 100K failures and may be generated in one or more seconds of time.

In some examples, the network planning and optimization tool may then run a risk analysis (RA) algorithm, such as an algorithm used by the risk analysis component 206 described in connection with FIG. 2, using the probabilistic failures, the intermediate capacitated cross-layer network topology, and the demands/flows with their respective SLO type. For example, the number of failures analyzed by the risk analysis algorithm may be on the order of 100K failures and the analysis may take on the order of hours of time, such as 12+ hours, to complete. In some examples, the risk analysis algorithm may use the intermediate capacitated cross-layer network topology and the demands/flows with their respective SLO type inputs to determine key network failures, as will be explained in greater detail below with respect to FIGS. 7 and 8.

The network planning and optimization tool may use the key network failures to generate the subsequent intermediate capacitated cross-layer network topology. The network planning and optimization tool may repeat the operation of block 620 until the subsequent intermediate capacitated cross-layer network topology is able to meet the network demands/flows with their respective SLO type.

At block 630, technique 600 may output the intermediate capacitated cross-layer topology that is able to meet network demands/flows with their respective SLO type as the final capacitated cross-layer topology. This final capacitated cross-layer topology may be compliant with both the failure policy and the SLO.

Figure 7:
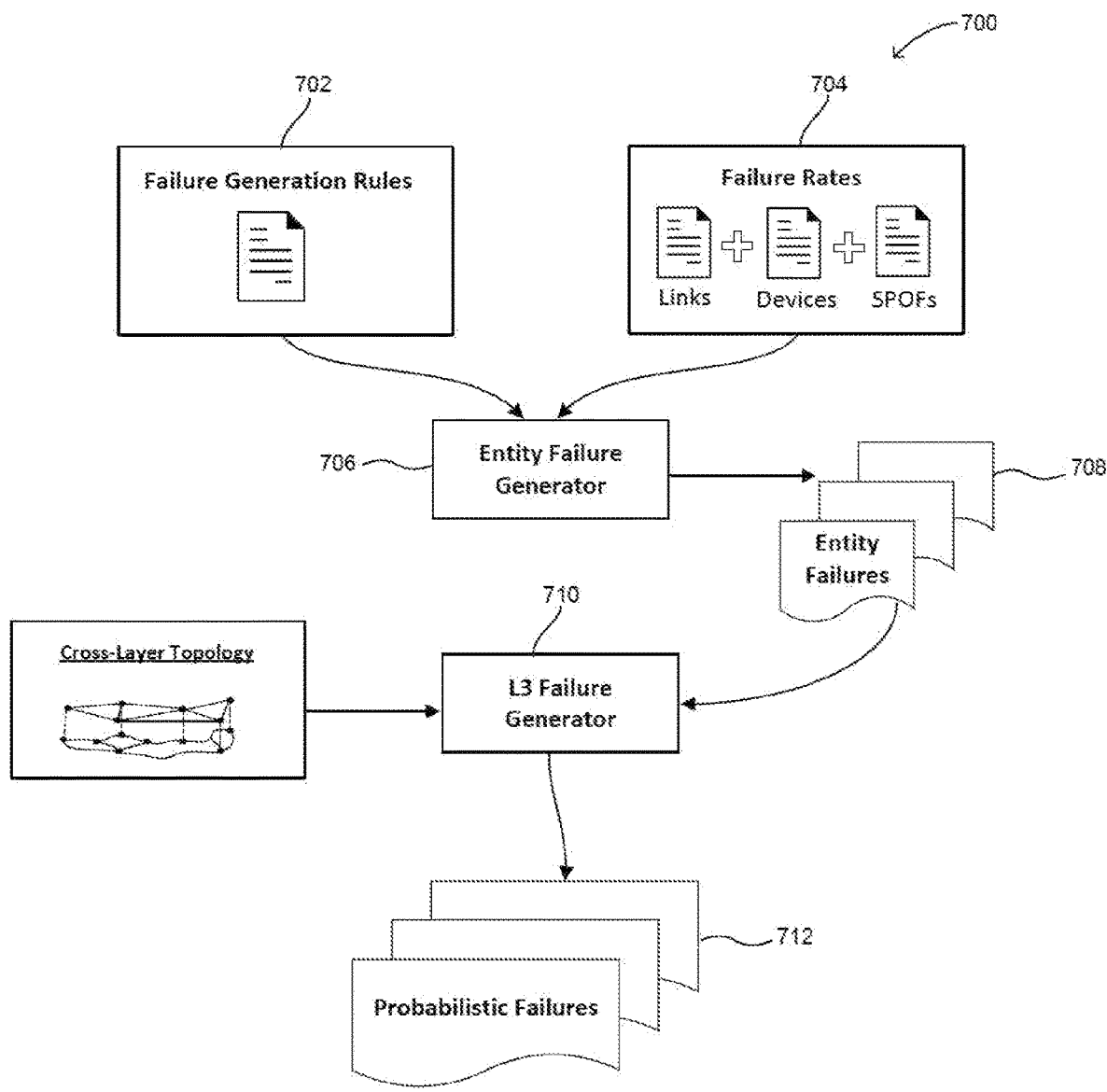
FIG. 7 depicts an example block flow diagram that may be used to generate probabilistic failures.

FIG. 7 depicts an example block flow diagram 700 that may be used to generate probabilistic failures. At block 702, failure generation policies/rules may be used to generate policy/rule-based possible asset/entity failures within a network. These policies/rules may be determined using past information, network simulations, and/or other information from network designers. At block 704, possible failures from different network assets/entities, such as communication links, devices, and/or SPOFs, may be generated using network asset failure rates. For example, the failure rates for network assets may be derived from past data of failures and/or from network simulations that simulate such failures using a network simulator. At block 704, the global probabilistic failure generator, a regional, such as metro, probabilistic failure generator, and/or a metro pair probabilistic failure generator, described above, may be used to generate the possible failures. At block 706, the possible failures from blocks 702 and 704 may be combined and input to an asset/entity failure generator. At block 706, the asset/entity failure generator may be used to "dial"/adjust the number of asset/entity failures generated. For example, asset/entity failure threshold(s) may be used to "dial"/adjust the number of asset failures generated. At block 708, each of the combined asset/entity failures generated at block 706 may be combined into a set of the asset/entity failures generated. At block 710, L3 failures may be generated using an input capacitated cross-layer network topology together with each of the failures in the set of asset/entity failures from block 708. For example, each of the failures in the set of asset/entity failures generated at block 708 may be mapped to the communication links/paths of the L1 network topology associated with the input capacitated cross-layer network topology. Each of the failures of the set of asset/entity failures may also be mapped to L3 network topology communications links/paths, for example, via the mapping between the L1 network topology and the L3 network topology. At block 710, each of the failures of the set of asset/entity failures in the L3 network topology may be "dialed"/adjusted. For example, failure threshold(s) may be used to "dial"/adjust the failures in the set of failures in the L3 network topology, which may also be mapped to the capacitated cross-layer network topology. At block 710, the failure-flow impact of each of the failures in the set of asset/entity failures generated at block 708 may be calculated with regards to the L1 network topology. For example, the impact of these failures on the network flow availability SLO or some function thereof may be calculated. In this example, the failure-flow impact and the flow availability SLO may be a function of an unrouted fraction of network traffic. At block 710, the probability of each of the failures in the set of asset/entity failures occurring in the L1 and/or L3 network topology may be calculated. At block 712, a set of probabilistic failures may be generated where each of the probabilistic failures may include each of the failures in the set of asset/entity failures. Each probabilistic failure of the set of probabilistic failures may be defined in terms of the L1 communication links/paths that it affects. In some examples, each of the probabilistic failures in the set of probabilistic failures may include a network's state probability related to the particular probabilistic failures. In some examples, the elements of the set of probabilistic failures may have a particular format, which includes information regarding the left over fraction of traffic that may be routed as a result of the failure. In some examples, the probabilistic failures may include the associated cross-layer network topology, the failure-flow impact, and/or the probability of each of the failures in the set of asset/entity failures occurring in the L1 and/or L3 network topology. At block 712, this set of probabilistic failures may be stored, for example in one or more memories and/or a storage, for future use. For example, the set of probabilistic failures may be used to generate key network failures.

Figure 8:
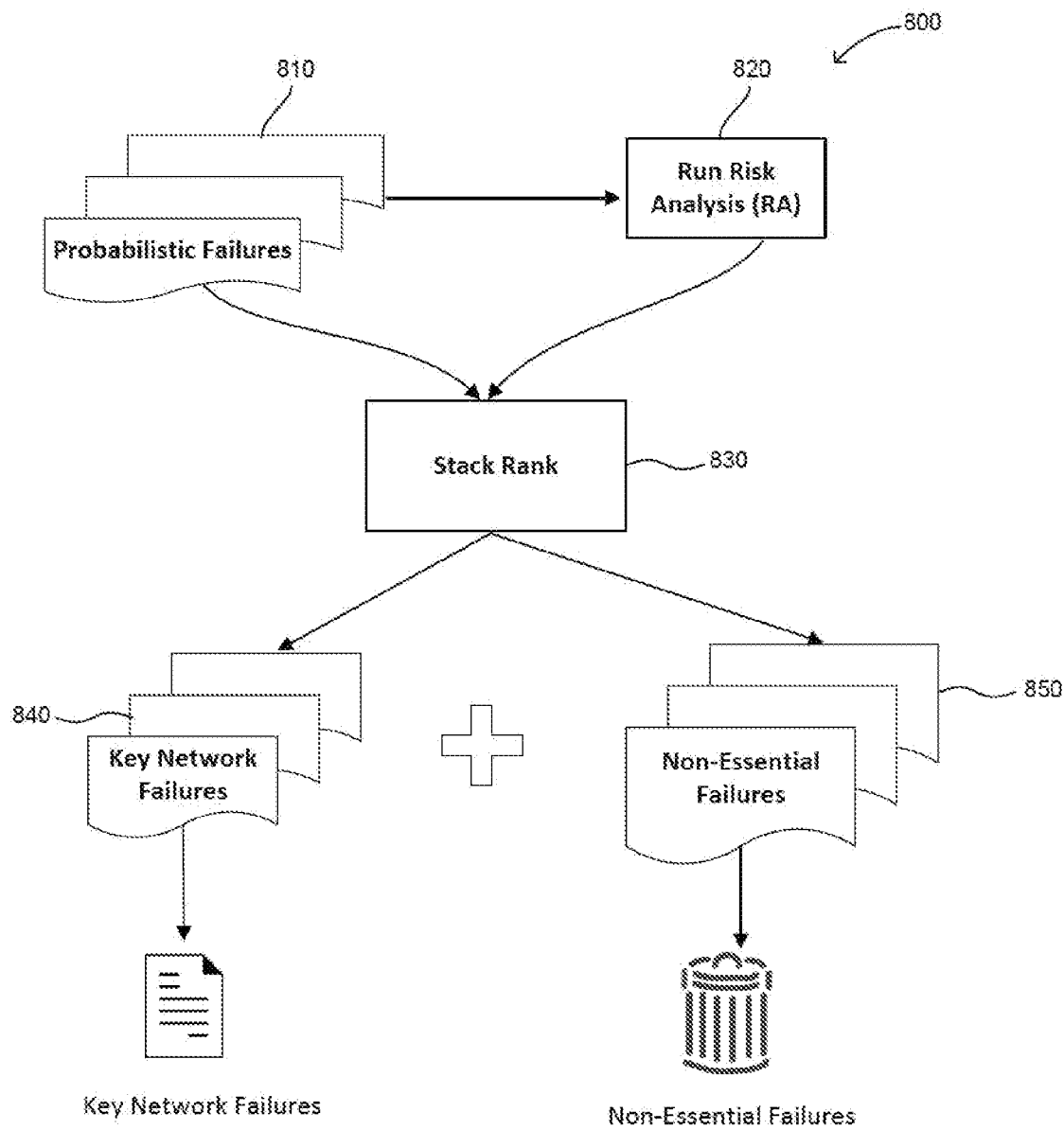
FIG. 8 depicts an example block flow diagram that may be used to generate key network failures from a set of probabilistic failures.

FIG. 8 depicts an example block flow diagram 800 that may be used to generate key network failures from a set of probabilistic failures. At block 810, a set of probabilistic failures for a physical network topology may be generated using failure generation rules and/or failure rates. For example, the physical network topology may include a number of assets, such as 700 assets. Each of these assets may be associated with a failure rate and/or particular rules for when failures may occur. The set of probabilistic failures may include the possible failures that may occur when considering the failure rates and/or the rules associated with each asset in the network. For example, the set of probabilistic failures may be on the order of 100K failures, and may be generated in one or more seconds of time in a network with 700 assets. The probabilistic failures may include key network failures and non-essential network failures, which may each be subsets of the probabilistic failures. In some examples, at block 810, the set of probabilistic failures generated and/or stored at block 712, described in connection with FIG. 7, and may be retrieved at block 810.

At block 820, a risk analysis (RA) algorithm, such as an algorithm used by the risk analysis component 206 described in connection with FIG. 2, may be run using the set of probabilistic failures to determine failure-flow impact for each probabilistic failure in the set of probabilistic failures. For example, the failure-flow impact may be a flow unavailability SLO measure, which may be related to an unrouted fraction of network traffic.

At block 820, the set of probabilistic failures, a capacitated cross-layer topology, such as the intermediate capacitated cross-layer topology 324 described in connection with FIG. 3, and demands/flows, such as demands/flows with their respective SLO type 308 described in connection with FIG. 3, may be received and/or used as inputs. The risk analysis algorithm may use these inputs to analyze the capacitated cross-layer topology. In some examples, the risk analysis algorithm may determine and output the per flow unrouted fraction of network traffic across all network states, such as the per flow unrouted demand across all network states 332 described in connection with FIG. 3. For example, the risk analysis algorithm may use on the order of 100K probabilistic failures for its analysis, and the analysis may take on the order of hours of time, such as 12+ hours, to complete in a network with 700 assets. As described above, the risk analysis algorithm may be a part of the network planning and optimization tool or may be separate.

At block 830, each probabilistic failure in the set of probabilistic failures may be stack ranked based on its respective failure-flow impact and/or its associated network's state probability to generate a stack ranked set of probabilistic failures. In some examples, stack ranking each probabilistic failure may involve fitting the failure-flow impact values and/or network's state probability calculated for each probabilistic failure in the set of probabilistic failures to a curve such as a bell curve. In some examples, stack ranking each probabilistic failure may involve bucketing the failure-flow impact values and/or network's state probability calculated for each probabilistic failure in the set of probabilistic failures into two or more buckets. In these examples, a bucket may include a subset of the set of probabilistic failures causing a high amount of failure-flow impact, such as at least 90% unrouted fraction of network traffic, and/or associated with a high network's state probability. In these examples, another bucket may include a subset of the set of probabilistic failures causing a lower amount of failure-flow impact, such as less than 90% unrouted fraction of network traffic, and/or associated with a low network's state probability. In these examples, stack ranking each probabilistic failure may involve comparing each of the failure-flow impact values calculated for each probabilistic failure in the set of probabilistic failures to a threshold value to determine in which bucket the probabilistic failure belongs. In these examples, stack ranking each probabilistic failure may involve comparing the network's state probability to a threshold value to determine in which bucket the probabilistic failure belongs. In these examples, the threshold(s) may be dependent on attributes of the network and/or network topology, such as the size of the network or the types of devices in the network. In some examples, stack ranking probabilistic failures may involve ranking on the order of 100K such failures and may be performed on the order of 1 or more seconds in a network with 700 assets.

At block 840, a subset of probabilistic failures in the set of probabilistic failures may be generated based on the stack ranked set of probabilistic failures. This subset may also be provided to a network planning and optimization tool, such as network planning and optimization tool 200 described in connection with FIG. 2. In some examples, the subset of the set of probabilistic failures, determined at block 830, may be referred to as key network failures. These key network failures may be network failures associated with a high network's state probability and/or causing a high amount of failure-flow impact, such as at least 90% unrouted fraction of network traffic. In some examples, the number of key network failures may be on the order of 10K failures in a network with 700 assets. In some examples, the generated key network failures may be stored in storage, memory, and/or a file.

At block 850, a subset of probabilistic failures in the set of probabilistic failures having a lower amount of failure-flow impact may be generated based on the stack ranked set of probabilistic failures. This subset may not be provided to a network planning and optimization tool. In some examples, the subset of the set of probabilistic failures, determined at block 830, that were associated with a low network's state probability and/or causing a low amount of failure-flow impact, such as less than 90% unrouted fraction of network traffic, may be referred to as non-essential failures. In some examples, the number of non-essential network failures may be on the order of 100K failures in a network with 700 assets. In some examples, the generated non-essential network failures may be discarded or stored for future reference.

Figure 9:
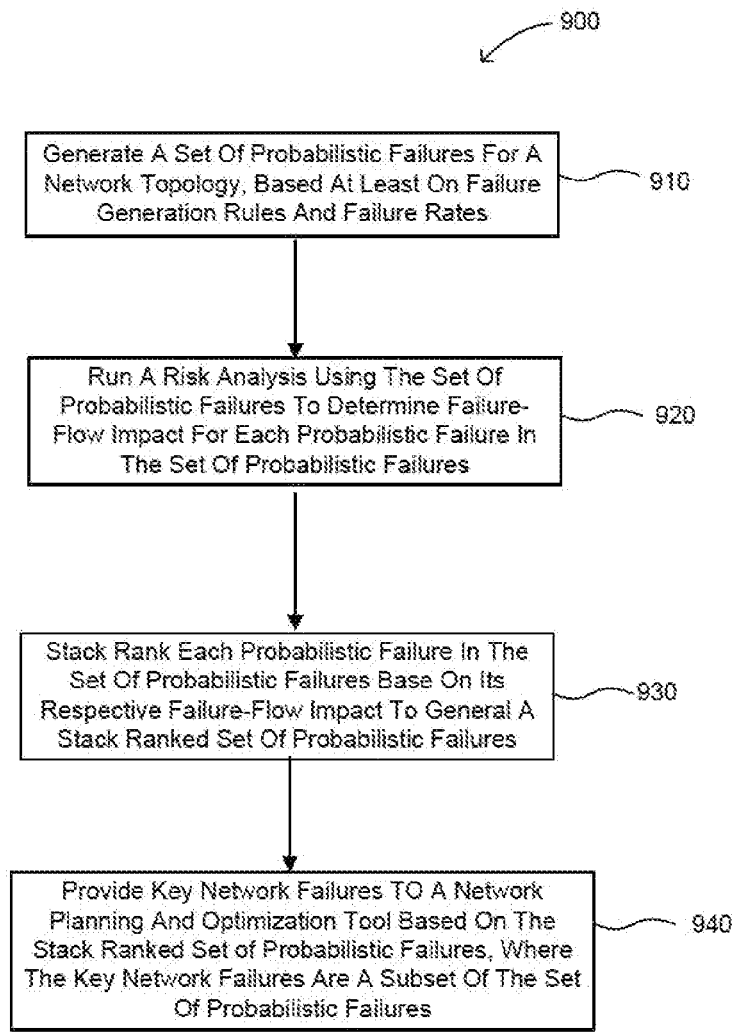
FIG. 9 is a flow diagram of an example process for determining key network failures.

FIG. 9 is a flow diagram of example process 900 for determining network failures. In some examples, the blocks of process 900 may be performed in whole or in part by a network planning and optimization tool, such as network planning an optimization tool 200 described in connection with FIG. 2. In some examples, the blocks of process 900 may be performed in whole or in part by an electronic device, such as electronic device 1000 described in connection with FIG. 10 and/or one or more processors associated with the electronic device. At block 910, a set of probabilistic failures for a network topology may be generated based at least on failure generation rules and failure rates. In some examples, the set of probabilistic failures may be generated using the techniques of block flow diagram 700 described in connection with FIG. 7. For example, a physical network topology may include a number of assets, such as 700 assets. Each of these assets may be associated with a failure rate and/or particular rules for when failures may occur. The set of probabilistic failures may include the possible failures that may occur when considering the failure rates and/or the rules associated with each asset in the network. For example, the set of probabilistic failures may be on the order of 100K failures, and may be generated in one or more seconds of time in a network with 700 assets. The probabilistic failures may include key network failures and non-essential network failures, which may each be subsets of the probabilistic failures. In some examples, at block 910, the set of probabilistic failures generated and/or stored in a storage, one or more memories, and/or a file.

At block 920, a risk analysis may be performed using the set of probabilistic failures to determine a failure-flow impact for each probabilistic failure in the set of probabilistic failures. In some examples, a risk analysis (RA) algorithm, such as an algorithm used by the risk analysis component 206 described in connection with FIG. 2, may be performed using the set of probabilistic failures to determine failure-flow impact for each probabilistic failure in the set of probabilistic failures. For example, the failure-flow impact may be a flow unavailability SLO measure, which may be related to an unrouted fraction of network traffic. At block 920, the set of probabilistic failures, a capacitated cross-layer topology, such as the intermediate capacitated cross-layer topology 324 described in connection with FIG. 3, and demands/flows, such as demands/flows with their respective SLO type 308 described in connection with FIG. 3 may be received and/or used as inputs. The risk analysis algorithm may use these inputs to analyze the capacitated cross-layer topology. In some examples, the risk analysis algorithm may determine and output the per flow unrouted fraction of network traffic across all network states, such as the per flow unrouted demand across all network states 332 described in connection with FIG. 3. For example, the risk analysis algorithm may use on the order of 100K probabilistic failures for its analysis, and the analysis may take on the order of hours of time, such as 12+ hours, to complete in a network with 700 assets. As described above, the risk analysis algorithm may be a part of the network planning and optimization tool or may be separate.

At block 930, each probabilistic failure in the set of probabilistic failures may be stack ranked based on its respective failure-flow impact to generate a stack ranked set of probabilistic failures. The failure-flow impact may be related to a flow availability service level objective (SLO). In some examples, stack ranking each probabilistic failure may involve fitting the failure-flow impact values and/or network's state probability calculated for each probabilistic failure in the set of probabilistic failures to a curve such as a bell curve. In some examples, stack ranking each probabilistic failure may involve bucketing the failure-flow impact values and/or network's state probability calculated for each probabilistic failure in the set of probabilistic failures into two or more buckets. In these examples, a bucket may include a subset of the set of probabilistic failures causing a high amount of failure-flow impact, such as at least 90% unrouted fraction of network traffic, and/or associated with a high network's state probability. In these examples, another bucket may include a subset of the set of probabilistic failures causing a lower amount of failure-flow impact, such as less than 90% unrouted fraction of network traffic, and/or associated with a low network's state probability. In these examples, stack ranking each probabilistic failure may involve comparing each of the failure-flow impact values calculated for each probabilistic failure in the set of probabilistic failures to a threshold value to determine in which bucket the probabilistic failure belongs. In these examples, stack ranking each probabilistic failure may involve comparing the network's state probability to a threshold value to determine in which bucket the probabilistic failure belongs. In these examples, the threshold(s) may be dependent on attributes of the network, such as the size of the network, or the types of devices in the network. In some examples, stack ranking probabilistic failures may involve ranking on the order of 100K such failures and may be performed on the order of 1 or more seconds in a network with 700 assets.

At block 940, key network failures may be provided to a network planning and optimization tool based on the stack ranked set of probabilistic failures. The key network failures may be a subset of the stack ranked set of the probabilistic failures. Non-essential failures may be another subset of the stack ranked set of the probabilistic failures. In some examples, a subset of the set of probabilistic failures, determined at block 930, that were associated with a high network's state probability and/or causing a high amount of failure-flow impact, such as higher than a threshold of at least 90% unrouted fraction of network traffic, may be referred to as key network failures. In some examples, the number of key network failures may be on the order of 10K failures in a network with 700 assets. In some examples, the generated key network failures may be stored in storage, one or more memories, and/or a file. The network planning and optimization tool may use the key network failures to compute a network, such as by generating one or more capacitated network topologies. The network planning and optimization tool may use the key network failures and the network topology to determine a new network topology.

Performing network optimization by generating and using key network failures, without considering additional or different failures, may be faster and more computationally efficient and more scalable than conventional techniques, and may produce a sufficiently high accuracy of flow availability SLO. As such, the generation and use of key network failures may improve existing network planning and optimization tool technology by allowing network planning and optimization to be performed faster, more efficiently, and in a way that can more easily scale as compared to conventional tools.

Figure 10:
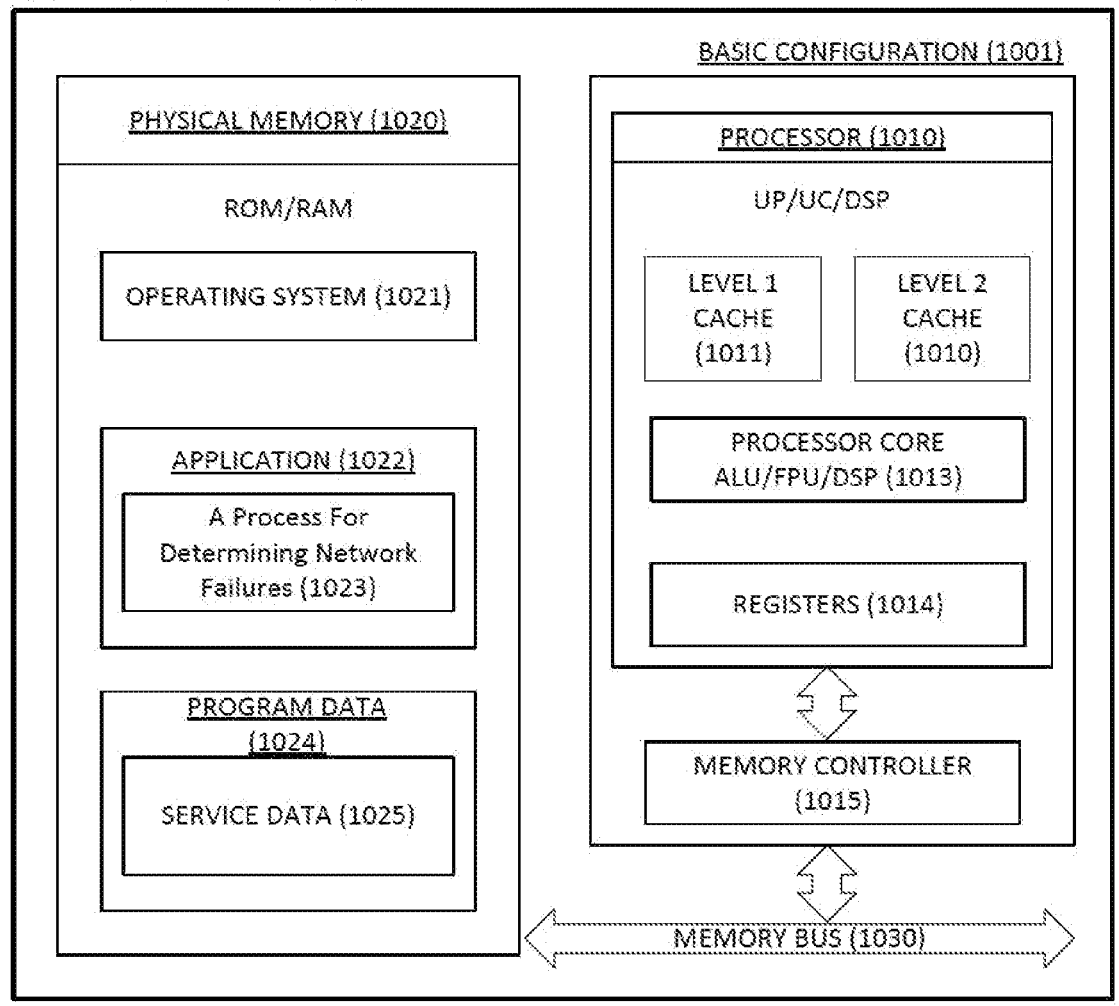
FIG. 10 depicts a block diagram of an example electronic device in accordance with aspects of the disclosure.

FIG. 10 depicts a block diagram of an example electronic device 1000. The electronic device 1000 may include one or more processor 1010, system memory 1020, a bus 1030, the networking interface(s) (not shown), and other components (not shown), such as storage(s), output device interface(s), input device interface(s). A bus 1030 may be used for communicating between the processor 1010, the system memory 1020, the networking interface(s), and other components. Any or all components of electronic device 1000 may be used in conjunction with the subject of the present disclosure.

Depending on the desired configuration, the processor 1010 may be of any type including but not limited to a tensor processing unit (TPU), a microprocessor, a microcontroller, a digital signal processor (DSP), or any combination thereof. The processor 1010 may include one more level of caching, such as a level one cache 1011 and a level two cache 1012, a processor core 1013, and registers 1014. The processor core 1013 may include one or more arithmetic logic unit (ALU), one or more floating point unit (FPU), one or more DSP core, or any combination thereof. A memory controller 1015 may also be used with the processor 1010, or in some implementations the memory controller 1015 can be an internal part of the processor 1010.

Depending on the desired configuration, the physical memory 1020 may be of any type including but not limited to volatile memory, such as RAM, non-volatile memory, such as ROM, flash memory, etc., multiple of these memories, or any combination thereof. The physical memory 1020 may include an operating system 1021, one or more applications 1022, and program data 1024, which may include service data 1025. Non-transitory computer-readable medium program data 1024 may include storing instructions that, when executed by the one or more processing devices, implement a process for determining key network failures 1023. In some examples, non-transitory computer-readable medium program data 1024 may include storing instructions that, when executed by the one or more processing devices, implement aspects or all of the functionality of the network planning and optimization tool, such as network planning an optimization tool 200 described in connection with FIG. 2, and its components. In some examples, the network planning and optimization tool may be implemented as a part of hardware components that are within the electronic device 1000 or separate. In some examples, the one or more applications 1022 may be arranged to operate with program data 1024 and service data 1025 on an operating system 1021.

The electronic device 1000 may have additional features or functionality, and additional interfaces to facilitate communications between the basic configuration 1001 and any required devices and interfaces.

Physical memory 1020 may be an example of computer storage media. Computer storage media includes, but is not limited to, RAM, ROM, EEPROM, flash memory or other memory technology, or any other medium which can be used to store the desired information and which can be accessed by electronic device 1000. Any such computer storage media can be part of the device 1000.

Network interface(s) may couple the electronic device 1000 to a network (not shown) and/or to another electronic device (not shown). In this manner, the electronic device 1000 can be a part of a network of electronic devices, such as a local area network ("LAN"), a wide area network ("WAN"), an intranet, or a network of networks, such as the Internet. In some examples, the electronic device 1000 may include a network connection interface for forming a network connection to a network and a local communications connection interface for forming a tethering connection with another device. The connections may be wired or wireless. The electronic device 1000 may bridge the network connection and the tethering connection to connect the other device to the network via the network interface(s).

The electronic device 1000 may be implemented as a portion of a small form factor portable (or mobile) electronic device such as a speaker, a headphone, an earbud, a cell phone, a smartphone, a smartwatch, a personal data assistant (PDA), a personal media player device, a tablet computer (tablet), a wireless web-watch device, a personal headset device, a wearable device, an application-specific device, or a hybrid device that include any of the above functions. The electronic device 1000 may also be implemented as a personal computer including both laptop computer and non-laptop computer configurations. The electronic device 1000 may also be implemented as a server, an accelerator, a datacenter, or a large-scale system.

Aspects of the present disclosure may be implemented as a computer implemented process, a system, or as an article of manufacture such as a memory device or non-transitory computer readable storage medium. The computer readable storage medium may be readable by an electronic device and may comprise instructions for causing an electronic device or other device to perform processes and techniques described in the present disclosure. The computer readable storage medium may be implemented by a volatile computer memory, non-volatile computer memory, solid state memory, flash drive, and/or other memory or other non-transitory and/or transitory media. Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible examples. Further, the same reference numbers in different drawings can identify the same or similar elements.

Numerous examples are described in the present application, and are presented for illustrative purposes only. The described examples are not, and are not intended to be, limiting in any sense. One of ordinary skill in the art will recognize that the disclosed subject matter may be practiced with various modifications and alterations, such as structural, logical, software, and electrical modifications. It should be understood that the described features are not limited to usage in the one or more particular examples or drawings with reference to which they are described, unless expressly specified otherwise.

The invention claimed is:

1. A method for determining network topologies, the method comprising:
   generating, with one or more processors, a set of probabilistic failures for a network topology based on one or more failure generation rules and one or more failure rates;
   determining, with the one or more processors, key network failures of the set of probabilistic failures based on a failure-flow impact for respective probabilistic failures in the set of probabilistic failures, the key network failures being a subset of the set of probabilistic failures, wherein the key network failures are associated with respective failure-flow impacts that cause an unrouted fraction of network traffic of the network topology to be greater than a threshold; and
   generating, with the one or more processors, the network topology based on the key network failures.

2. The method of claim 1, wherein determining the key network failures further comprises:
   determining the failure-flow impact for each probabilistic failure by performing a risk analysis; and
   stack-ranking each probabilistic failure in the set of probabilistic failures based on its respective failure-flow impact, wherein the determined key network failures are a subset of the stack-ranked set of probabilistic failures.

3. The method of claim 1, further comprising determining, with the one or more processors, routing for the network topology.

4. The method of claim 1, further comprising:
   generating, with the one or more processors, a per-flow unrouted fraction of traffic demanded across network states; and
   computing, with the one or more processors, a flow availability service level objective (SLO) for the network topology based on the per-flow unrouted fraction of traffic demanded.

5. The method of claim 4, further comprising:
   determining, with the one or more processors, the flow availability SLO is above a threshold; and
   outputting, with the one or more processors, the network topology.

6. The method of claim 4, further comprising:
   determining, with the one or more processors, the flow availability SLO is below a threshold; and
   generating, with the one or more processors, a subsequent set of probabilistic failures accounting for a target network capacity.

7. The method of claim 6, further comprising:
   determining, with the one or more processors, subsequent key network failures of the subsequent set of probabilistic failures based on a failure-flow impact for each probabilistic failure in the subsequent set of probabilistic failures; and
   generating, with the one or more processors, a subsequent network topology based on the subsequent key network failures.

8. A system comprising:
   one or more processors; and
   one or more storage devices in communication with the one or more processors and storing instructions that, when executed by the one or more processors, cause the one or more processors to perform operations for determining network topologies, the operations comprising:
      generating a set of probabilistic failures for a network topology based on one or more failure generation rules and one or more failure rates;
      determining key network failures of the set of probabilistic failures based on a failure-flow impact for respective probabilistic failures in the set of probabilistic failures, the key network failures being a subset of the set of probabilistic failures, wherein the key network failures are associated with respective failure-flow impacts that cause an unrouted fraction of network traffic of the network topology to be greater than a threshold; and
      generating the network topology based on the key network failures.

9. The system of claim 8, wherein determining the key network failures further comprises:
   determining the failure-flow impact for each probabilistic failure by performing a risk analysis; and
   stack-ranking each probabilistic failure in the set of probabilistic failures based on its respective failure-flow impact, wherein the determined key network failures are a subset of the stack-ranked set of probabilistic failures.

10. The system of claim 8, wherein the operations further comprise determining routing for the network topology.

11. The system of claim 8, wherein the operations further comprise:

generating a per-flow unrouted fraction of traffic demanded across network states; and computing a flow availability service level objective (SLO) for the network topology based on the per-flow unrouted fraction of traffic demanded.

12. The system of claim 11, wherein the operations further comprise:
    determining the flow availability SLO is above a threshold; and
    outputting the network topology.

13. The system of claim 11, wherein the operations further comprise:
    determining the flow availability SLO is below a threshold; and
    generating a subsequent set of probabilistic failures accounting for a target network capacity.

14. The system of claim 13, wherein the operations further comprise:
    determining subsequent key network failures of the subsequent set of probabilistic failures based on a failure-flow impact for each probabilistic failure in the subsequent set of probabilistic failures; and
    generating a subsequent network topology based on the subsequent key network failures.

15. A non-transitory computer-readable medium storing instructions, that when executed by one or more processors, cause the one or more processors to perform operations for determining network topologies, the operations comprising:
    generating a set of probabilistic failures for a network topology based on one or more failure generation rules and one or more failure rates;
    determining key network failures of the set of probabilistic failures based on a failure-flow impact for respective probabilistic failures in the set of probabilistic failures, the key network failures being a subset of the set of probabilistic failures, wherein the key network failures are associated with respective failure-flow impacts that cause an unrouted fraction of network traffic of the network topology to be greater than a threshold; and
    generating the network topology based on the key network failures.

16. The non-transitory computer-readable medium of claim 15, wherein determining the key network failures further comprises:
    determining the failure-flow impact for each probabilistic failure by performing a risk analysis; and
    stack-ranking each probabilistic failure in the set of probabilistic failures based on its respective failure-flow impact, wherein the determined key network failures are a subset of the stack-ranked set of probabilistic failures.

17. The non-transitory computer-readable medium of claim 15, wherein the operations further comprise determining routing for the network topology.

18. The non-transitory computer-readable medium of claim 15, wherein the operations further comprise:
    generating a per-flow unrouted fraction of traffic demanded across network states; and
    computing a flow availability service level objective (SLO) for the network topology based on the per-flow unrouted fraction of traffic demanded.

19. The non-transitory computer-readable medium of claim 18, wherein the operations further comprise:
    determining the flow availability SLO is above a threshold; and
    outputting the network topology.

20. The non-transitory computer-readable medium of claim 18, wherein the operations further comprise:
    determining the flow availability SLO is below a threshold;
    generating a subsequent set of probabilistic failures accounting for a target network capacity;
    determining subsequent key network failures of the subsequent set of probabilistic failures based on a failure-flow impact for each probabilistic failure in the subsequent set of probabilistic failures; and
    generating a subsequent network topology based on the subsequent key network failures.

* * * * *